(12) United States Patent
Shigemitsu et al.

(10) Patent No.: US 12,066,644 B2
(45) Date of Patent: Aug. 20, 2024

(54) OPTICAL PRISM WITH INTERLOCK

(71) Applicant: Apple Inc., Cupertino, CA (US)

(72) Inventors: Norimichi Shigemitsu, Yokohama (JP);
Jun Yoshida, Yokohama (JP);
Shunsuke Otake, Yokohama (JP);
Keiichi Yamazaki, Yokohama (JP)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/931,097

(22) Filed: Sep. 9, 2022

(65) Prior Publication Data

US 2023/0003924 A1 Jan. 5, 2023

Related U.S. Application Data

(63) Continuation of application No. 16/549,820, filed on Aug. 23, 2019, now Pat. No. 11,442,205.

(60) Provisional application No. 62/723,399, filed on Aug. 27, 2018.

(51) Int. Cl.
*G02B 5/04* (2006.01)
*G02B 7/02* (2021.01)
*H04N 23/55* (2023.01)

(52) U.S. Cl.
CPC .............. *G02B 5/04* (2013.01); *G02B 7/022* (2013.01); *H04N 23/55* (2023.01)

(58) Field of Classification Search
CPC ........ G02B 5/04; G02B 7/022; G02B 13/007; G02B 7/1805; G02B 7/003; G02B 13/0065; H04N 23/55
See application file for complete search history.

(56) References Cited

U.S. PATENT DOCUMENTS

| | | | |
|---|---|---|---|
| 6,704,052 B1 * | 3/2004 | Togino | H04N 23/55 348/340 |
| 8,837,929 B2 | 9/2014 | Nomura et al. | |
| 11,442,205 B2 | 9/2022 | Shigemitsu et al. | |
| 2004/0036798 A1 | 2/2004 | Saito et al. | |
| 2007/0024739 A1 | 2/2007 | Konno | |
| 2008/0225139 A1 | 9/2008 | Nomura et al. | |

(Continued)

FOREIGN PATENT DOCUMENTS

| | | |
|---|---|---|
| JP | 2007279136 | 10/2007 |
| TW | 201116876 | 5/2011 |

OTHER PUBLICATIONS

International Search report and written Opinion from PCT/US2019/048167, dated Aug. 26, 2019, (Apple Inc.), pp. 1-20.

*Primary Examiner* — Sinh Tran
*Assistant Examiner* — Zhenzhen Wu
(74) *Attorney, Agent, or Firm* — Robert C. Kowert; Kowert, Hood, Munyon, Rankin & Goetzel, P.C.

(57) ABSTRACT

An optical prism that includes an interlock structure that precisely couples to a complementary structure of a refractive lens. For precision, the interlock structure may be formed at the same time and using the same technique as the optical surface of the prism. The interlock structure provides high accuracy when assembling a folded lens system by precisely aligning the object side optical surface of the lens with the image side optical surface of the prism so that the optical axis is centered in the lens. The prism may have refractive power. A portion of the object side surface may be coated with an opaque material to provide an aperture stop at that surface.

20 Claims, 12 Drawing Sheets

(56) References Cited

U.S. PATENT DOCUMENTS

| | | |
|---|---|---|
| 2008/0266404 A1 | 10/2008 | Sato |
| 2008/0291543 A1 | 11/2008 | Nomura et al. |
| 2009/0212202 A1 | 8/2009 | Takahashi |
| 2009/0296238 A1 | 12/2009 | Kakuta |
| 2011/0001789 A1 | 1/2011 | Wilson et al. |
| 2012/0033303 A1* | 2/2012 | Nagaoka ................ H04N 23/55 356/615 |
| 2013/0021485 A1 | 1/2013 | Hsu |
| 2013/0278785 A1* | 10/2013 | Nomura ................ H04N 5/2254 348/208.11 |
| 2015/0092270 A1 | 4/2015 | Wang et al. |
| 2016/0112610 A1 | 4/2016 | Imai |
| 2016/0334626 A1 | 11/2016 | Sugihara et al. |
| 2017/0131529 A1 | 5/2017 | Lu et al. |
| 2018/0059379 A1 | 3/2018 | Chou |
| 2019/0387140 A1 | 12/2019 | Zhang |

\* cited by examiner (a) Side view (b) Top view

OPTICAL PRISM WITH INTERLOCK

PRIORITY INFORMATION

This application is a continuation of U.S. patent application Ser. No. 16/549,820, filed Aug. 23, 2019, which claims benefit of priority of U.S. Provisional Application Ser. No. 62/723,399, filed Aug. 27, 2018, which are incorporated by reference herein in their entirety.

BACKGROUND

Technical Field

This disclosure relates generally to camera systems, and more specifically to folded lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of an optical prism with interlock for folded lens systems are described. A folded lens system may, for example, be used in small form factor cameras in mobile multipurpose devices such as smartphones and tablet or pad devices. A folded lens system may include a prism and a lens stack including one or more refractive lens elements. The prism redirects light from a first optical axis to a second optical axis to thus provide a "folded" optical axis for the lens system. Using the prism to fold the optical axis may, for example, reduce the Z-height of the lens system, and thus may reduce the Z-height of a camera that includes the lens system.

In some embodiments, the folded lens system may include, from an object side to an image side, a prism and a lens stack including one or more refractive lenses. A reflective surface of the prism provides a folded optical axis for the lens system by bending the optical axis (e.g., by 90 degrees) to reduce the Z-height of the lens system. In some embodiments, at least a portion of the reflective surface is coated with a reflective material that reflects light in the prism to fold the optical axis. In some embodiments, a mirror on the reflective surface reflects light in the prism to fold the optical axis. In some embodiments, the reflective surface reflects light in the prism to fold the optical axis due to total internal reflection (TIR). In some embodiments, the prism may have refractive power. In some embodiments, one or both of the object and image side surfaces of the prism may be formed with an optical surface (e.g., a convex surface or concave surface) so that the prism refracts light in addition to folding the optical axis. In other words, the prism may have an integrated lens. Integrating a lens in the prism may help to reduce Z-height of the lens system, and also reduces the number of independent lens elements in the folded lens system. For example, in some embodiments, the prism may serve as the objective lens for the lens system, thus not requiring a separate objective lens on the object side of the prism. In some embodiments, a portion of the object side surface of the prism may be coated with an opaque material that provides an aperture stop at that surface.

The image side of the prism includes an interlock structure (e.g., a sloped, notched, or curved surface). In some embodiments, the image side of the prism is formed with a flange that includes the interlock structure (e.g., a sloped, curved, or notched surface on the flange). In some embodiments, the top and/or bottom of the flange may be truncated to reduce Z axis height. In some embodiments, the top of the flange may be truncated so that the flange does not extend above the plane of the object side. In some embodiments, the bottom of the flange may be truncated so that the flange does not extend below the edge where the image side meets the reflective side. A first lens on the image side of the prism has a complementary structure configured to precisely couple to the interlock structure of the prism. In some embodiments, for precision, the interlock structures may be formed at the same time and using the same technique as the optical surfaces of the prism and the lens. The interlock structures may provide high accuracy when assembling the lens system by precisely aligning the object side optical surface of the first lens with the image side optical surface of the prism so that the optical axis is centered in the first lens. The interlocking structure may also make lens system assembly much easier than conventional assembly methods that would require more complex alignment procedures.

The prism and lenses may be composed of any of a variety of optical materials, e.g. optical plastic, polymer, or glass, and may be injection molded or otherwise manufactured. In some embodiments, the prism may be formed of a material with an Abbe number that is higher than that of the refractive lenses.

In some embodiments, a second prism may be located at the image side of the lens stack to fold the optical axis on to a third axis. In some embodiments, the second prism may also include an interlock structure for coupling to a last lens element in the lens stack. In some embodiments, one or both of the object and image side surfaces of the second prism may be formed with an optical surface (e.g., a convex surface or concave surface) so that the second prism refracts light in addition to folding the optical axis.

Figure 1A:
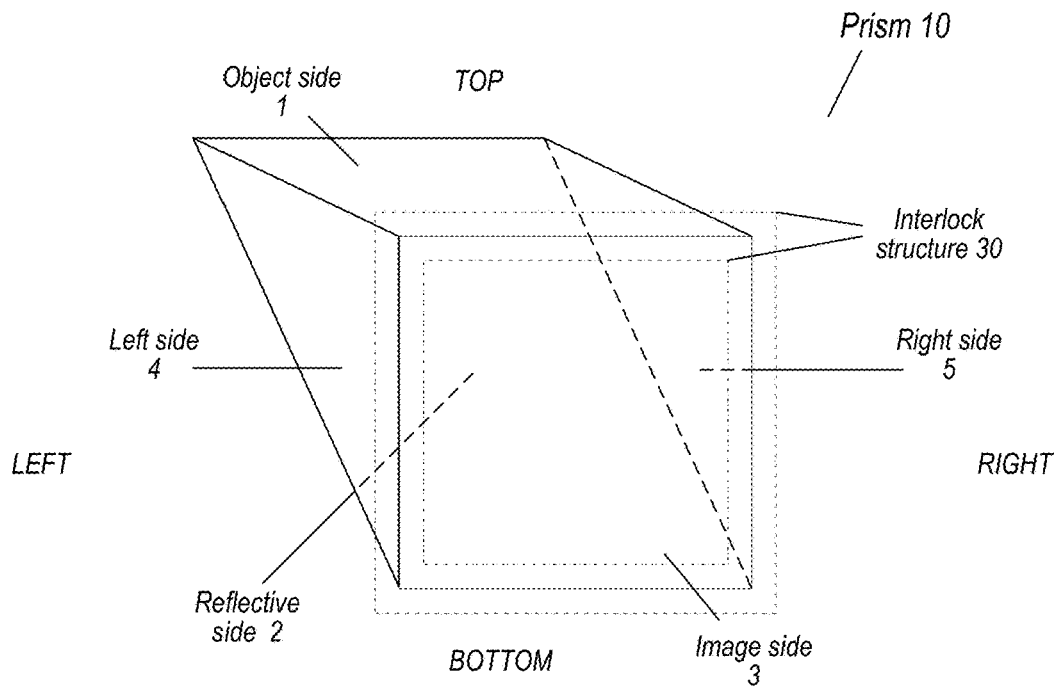
FIG. 1A illustrates geometry of an optical prism with interlock, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of an optical prism with interlock for folded lens systems are described. A folded lens system may include a prism and a lens stack including one or more refractive lens elements. The prism redirects light from a first optical axis to a second optical axis to thus provide a "folded" optical axis for the lens system. Using the prism to fold the optical axis may, for example, reduce the Z-height of the lens system, and thus may reduce the Z-height of a camera that includes the lens system. The image side of the prism includes an interlock structure (e.g., a sloped, notched, or curved surface). In some embodiments, the image side of the prism is formed with a flange that includes the interlock structure (e.g., a sloped, curved, or notched surface on the flange). In some embodiments, the top and/or bottom of the flange may be truncated to reduce Z axis height. In some embodiments, the top of the flange may be truncated so that the flange does not extend above the plane of the object side. In some embodiments, the bottom of the flange may be truncated so that the flange does not extend below the edge where the image side meets the reflective side. A first lens on the image side of the prism has a complementary interlock structure configured to precisely couple to the interlock structure of the prism. In some embodiments, for precision, the interlock structures may be formed at the same time and using the same technique as the optical surfaces of the prism and the lens. The interlock structures may provide high accuracy when assembling the lens system by precisely aligning the object side optical surface of the first lens with the image side optical surface of the prism so that the optical axis is centered in the first lens. The interlocking structure may also make lens system assembly much easier than conventional assembly methods that would require more complex alignment procedures.

While embodiments of a prism with an interlock structure on the image side of the prism for interlocking with a first lens on the image side of the prism are described, in some embodiments the prism may instead or also include an interlock structure on the object side for interlocking with an object-side lens.

While embodiments of a prism with refractive power that includes a convex or concave optical surface on the image side and that may also include a convex or concave optical surface on the object side are described, in some embodiments the prism may instead have a flat surface on the image side and/or on the object side.

FIG. 1A illustrates geometry of an optical prism with interlock, according to some embodiments. An optical prism 10 may include five sides: an object side 1, a reflective side 2, an image side 3, and left 4 and right 5 sides from the perspective of the image side 3. For the sake of discussion, the object side 1 may be considered to be at the "top" of the prism, with the bottom edge of the image side 2 at the "bottom" of the prism. The object side 1, reflective side 2, and image side 3 may be rectangular, and the left 4 and right 5 sides may be triangular. The object side 1 and image side 3 may include optical surfaces (e.g., convex or concave refractive surfaces). A portion of the object side 1 surface may be coated with an opaque material that provides an aperture stop at the object side 1. The reflective side 2 and left 4 and right 5 sides may be, but are not necessarily, planar surfaces. A reflective coating, a mirror, or total internal reflection (TIR) may be used at the reflective side 2 to redirect light in the prism 10. The left 4 and right 5 sides may be, but are not necessarily, coated with an opaque material to block incident light.

The image 3 side includes an interlock structure 30. In some embodiments, interlock structure 30 may be a protrusion extending outward from one or more of the sides of prism 10. A "protrusion" on a side of the prism 10 means that side is not completely planar (aside from convex or concave optical surfaces of object side 1 and image side 3); a portion of the side (the protrusion) extends outward from the plane of the side. For example, in the embodiment of FIGS. 2A and 2B, the interlock structure is a flange extending outward from the image side 3. In FIGS. 1A and 3, the interlock structure extends outward from the image side 3 and from the left 4 and right 5 sides.

In some embodiments, the image 3 side of the prism 10 is formed with a flange that includes the interlock structure 30 (e.g., a sloped, curved, or notched surface on the flange). In some embodiments, the top (object side) and/or bottom of the flange may be truncated to reduce Z axis height. In some embodiments, the top of the flange may be truncated so that the flange does not extend above the plane of the object side. In some embodiments, the bottom of the flange may be truncated so that the flange does not extend below the edge where the image side meets the reflective side. In some embodiments, when viewed from the object side, the flange and interlock structure 30 may be an annulus or ring (or partial annuli if truncated) that curves around the image side optical axis (see, e.g., FIGS. 1B and 3).

Figure 4:
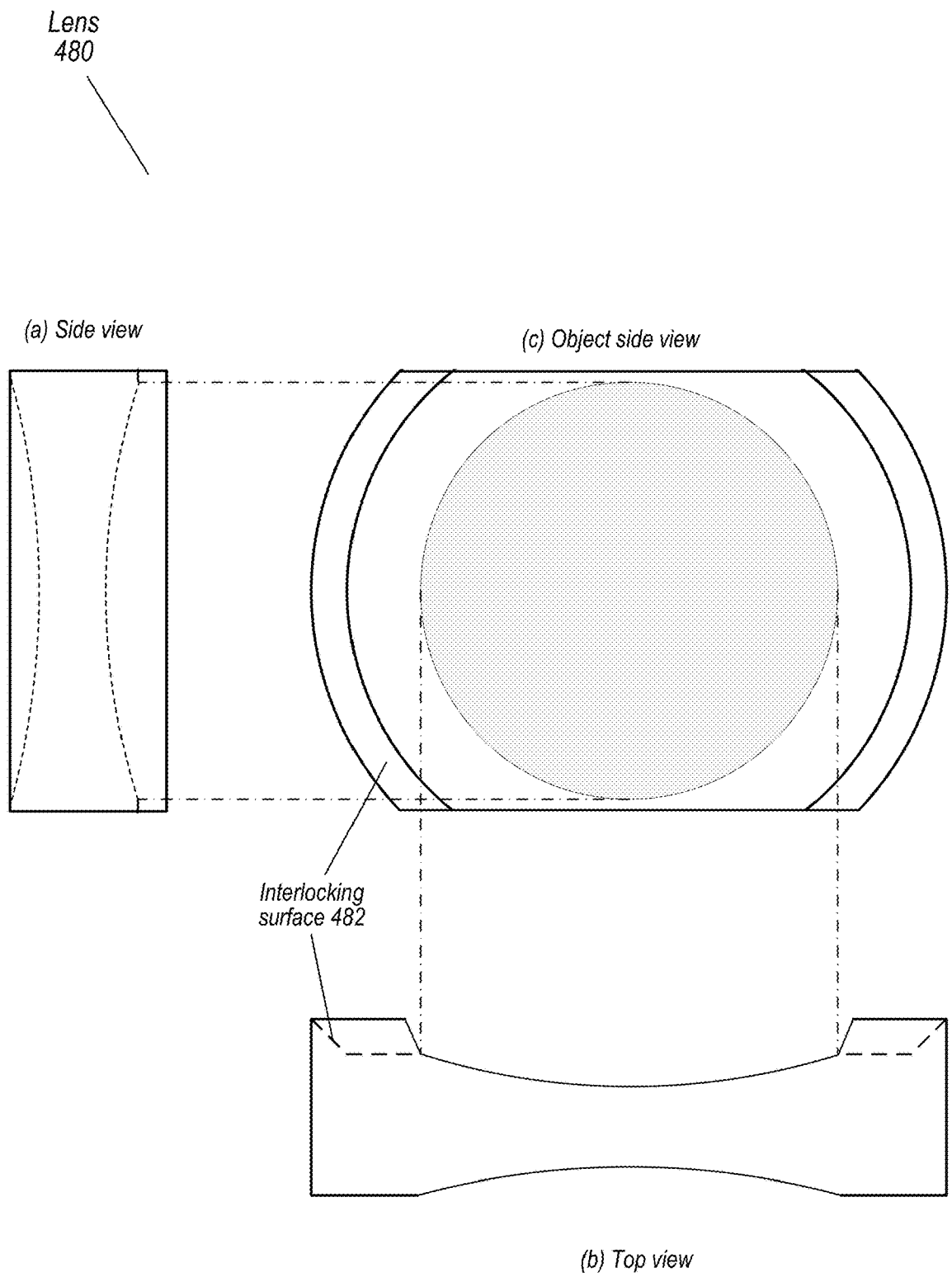
FIG. 4 is a diagram showing details of an example lens element with a corresponding interlock structure to that of the prism of FIG. 3, according to some embodiments.

While not shown in FIG. 1A, a lens may be formed with a corresponding interlock structure configured to precisely couple to the interlock structure 30 on the image side 3 of the prism 10 (see, e.g., FIG. 4). Corresponding portions of the interlock structure 30 of prism 10 and the interlock structure of the lens may have contacting surfaces that may limit or prevent movement of the lens with respect to the prism 10 in at least two directions (e.g., lateral to the optical axis and along the optical axis). In embodiments where the interlock structure is curved around the image side optical axis, the curvature may also help to restrict movement in the direction of the object side optical axis. In embodiments where the image side 3 of prism 10 has a convex optical surface, the interlock structure 30 may, but does not necessarily, extend past the apex of the convex optical surface. The complementary interlock structure of the lens may "reach past" the apex of the convex optical surface (along the image side 3 optical surface toward the prism 10) to reach the interlock structure 30 on the image side 3 of the prism 10.

In some embodiments, the interlock structure 30 of prism 10 may include a sloped surface that corresponds to a complementary sloped surface on the lens. The corresponding sloped surfaces are not parallel or perpendicular to the image side optical axis, which may help in limiting or preventing movement of the lens with respect to the prism 10 in the at least two directions mentioned above (e.g., lateral to the image side optical axis and along the image side optical axis).

Figure 1B:
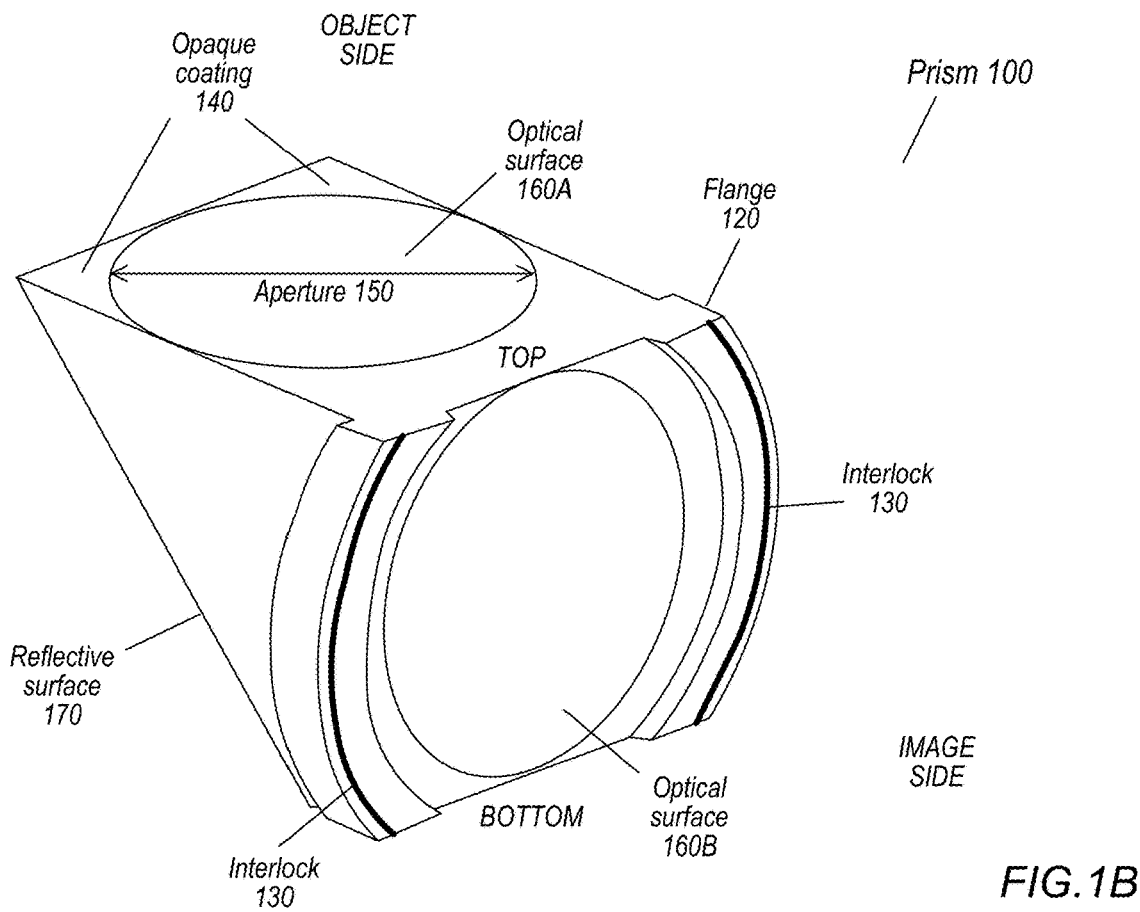
FIG. 1B illustrates an example optical prism with interlock, according to some embodiments.

FIG. 1B illustrates an example optical prism 100 with interlock 130 that may be used in folded lens systems, according to some embodiments. A reflective surface 170 of the prism folds the optical axis (e.g., by 90 degrees) to reduce the Z-height of a lens system. In some embodiments, at least a portion of the reflective surface 170 is coated with a reflective material that reflects light in the prism 100 to fold the optical axis. In some embodiments, a mirror on the reflective surface 170 reflects light in the prism 100 to fold the optical axis. In some embodiments, the reflective surface 170 reflects light in the prism 100 to fold the optical axis due to total internal reflection (TIR). In some embodiments, the prism 100 may have an integrated lens that provides refractive power (e.g., positive refractive power). In some embodiments, an image side of the prism 100 may include an optical surface 160B (e.g., a convex surface). In some embodiments, an object side of the prism 100 may include an optical surface 160A (e.g., a convex surface). In some embodiments, a portion of the object side surface of the prism 100 may be coated with an opaque material 140 that provides an aperture 150 at the object side surface.

The image side of the prism 100 includes an interlock 130 structure (e.g., a sloped, notched, or curved surface). In some embodiments, the image side of the prism 100 is formed with a flange 120 that includes the interlock 130 structure (e.g., a sloped, curved, or notched surface on the flange 120). In some embodiments, the top (object side) and/or bottom of the flange 120 may be truncated to reduce Z axis height, as shown in FIG. 1B. In some embodiments, the top of the flange 120 may be truncated so that the flange 120 does not extend above the plane of the object side. In some embodiments, the bottom of the flange 120 may be truncated so that the flange 120 does not extend below the edge where the image side meets the reflective side. A first lens on the image side of the prism may be formed with a complementary structure configured to precisely couple to the interlock 130 structure of the prism 100. In some embodiments, for precision, the interlock 130 structure may be formed at the same time and using the same technique as the optical surface 160B of the prism 100. The interlock 130 structures may provide high accuracy when assembling a lens system by precisely aligning the object side optical surface of a first lens with the image side optical surface 160B of the prism 100 so that the optical axis is centered in the first lens. The interlocking structure may also make lens system assembly much easier than conventional assembly methods that would require more complex alignment procedures.

The prism 100 may be composed of any of a variety of optical materials, e.g. optical plastic, polymer, or glass, and may be injection molded or otherwise manufactured. In some embodiments, the prism 100 may be formed of a material with an Abbe number that is higher than that of the refractive lens elements in the folded lens system.

Figure 2A:
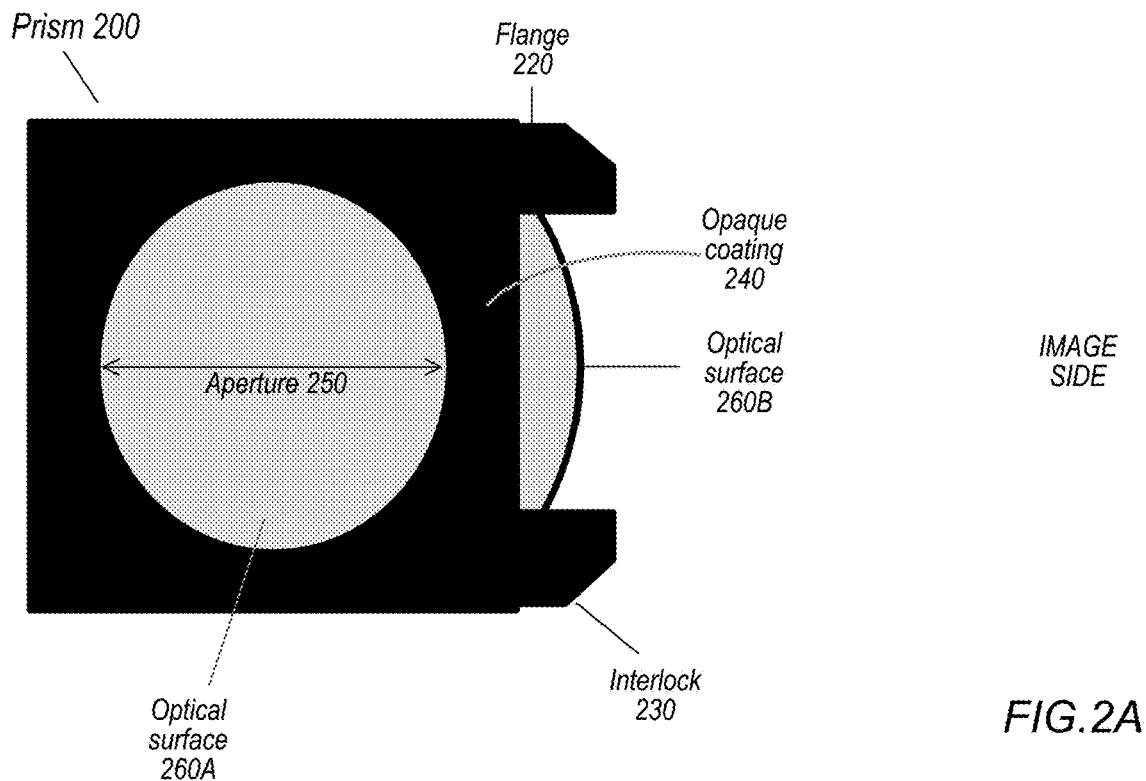
FIG. 2A illustrates an optical coating that provides an aperture at the object side surface of an example prism, according to some embodiments.
Figure 3:
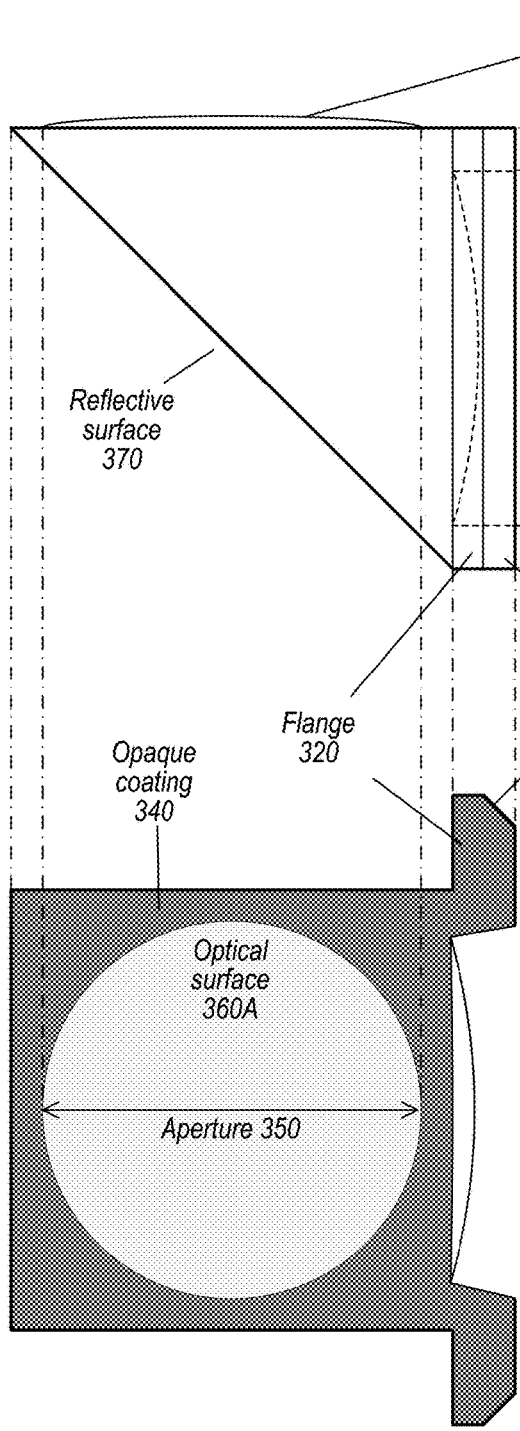
FIG. 3 is a diagram showing details of an example prism with an interlock structure, according to some embodiments
Figure 3:
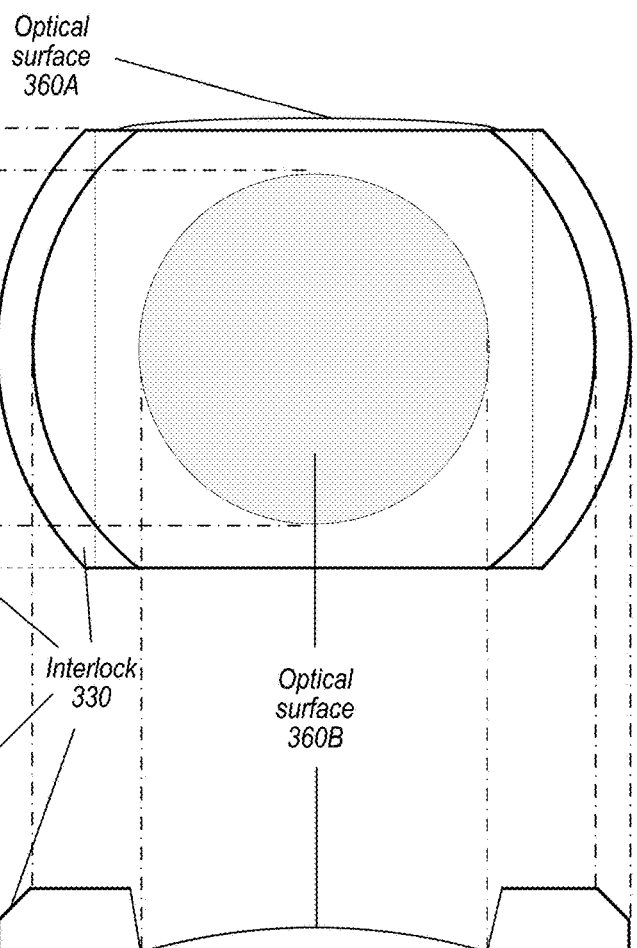

FIG. 2A illustrates an optical coating that provides an aperture at the object side surface of an example prism 200, according to some embodiments. FIG. 2A shows the object side of the prism 200. The prism 200 includes a flange 220 with an interlock 230 structure. The image side of the prism 200 includes a convex optical surface 260B. The object side of the prism 200 includes a convex optical surface 260A. A portion of the object side surface of the prism 200 is coated with an opaque material 240 that acts as an aperture stop at the object side surface, providing an aperture 250 at the optical surface 260A.

Figure 2B:
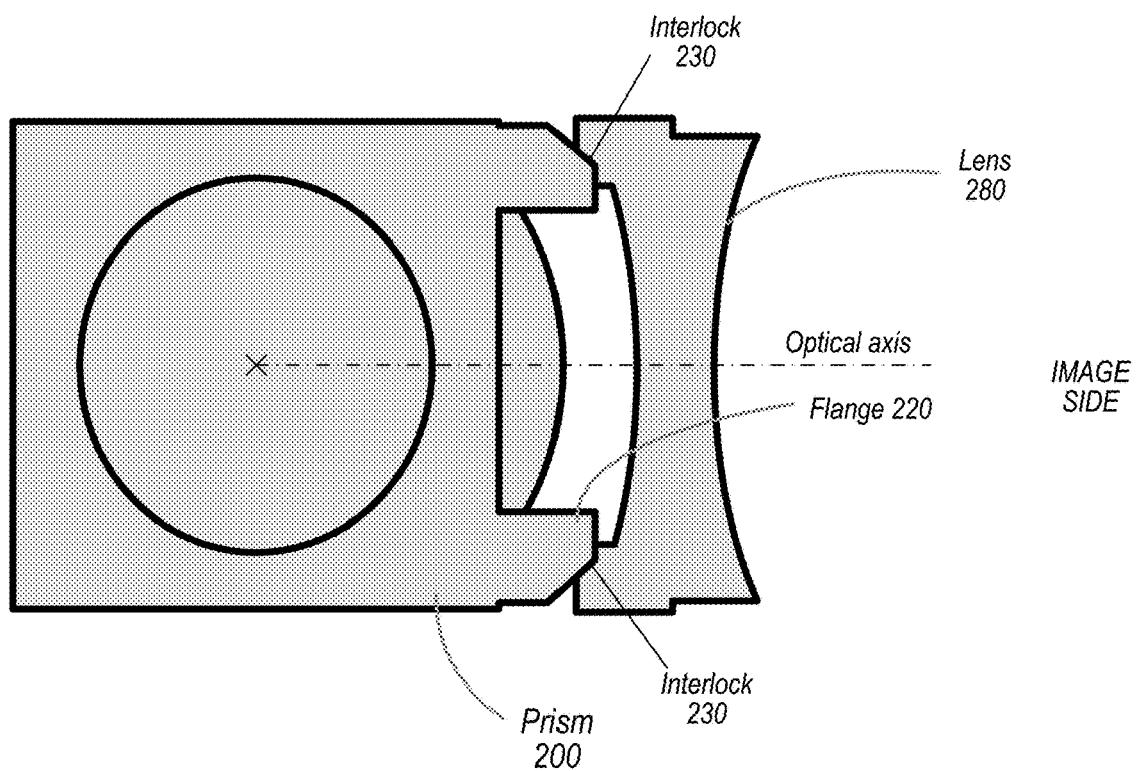
FIG. 2B illustrates a lens interlocked with a prism as illustrated in FIG. 2A, according to some embodiments.

FIG. 2B illustrates a lens 280 interlocked with a prism 200 as illustrated in FIG. 2A, according to some embodiments. A first lens 280 on the image side of the prism may be formed with a complementary structure that is configured to precisely couple to the interlock 230 structure of the prism 200. In some embodiments, for precision, the interlocking structure of the lens 280 may be formed at the same time and using the same technique as the optical surfaces of the lens 280. The interlock 230 structure may provide high accuracy when assembling a lens system by precisely aligning the object side optical surface of the first lens 280 with the image side optical surface 260B of the prism 200 so that the optical axis is centered in the first lens 280. The interlocking structures also make lens system assembly much easier than conventional assembly methods that would require more complex alignment procedures.

FIG. 3 is a diagram showing details of an example prism 300 with an interlock 330 structure and positive refractive power, according to some embodiments FIG. 3 shows a side view (a), an image side view (b), a top (object side) view (c), and a bottom view (d) of the prism 300. The prism 300 includes a flange 320 with an interlock 330 structure. As shown in the image side view (c) of the prism 300, the top and bottom of the flange 320 may be truncated to reduce Z axis height. In some embodiments, the top of the flange 320 may be truncated so that the flange 320 does not extend above the plane of the object side. In some embodiments, the bottom of the flange 320 may be truncated so that the flange 320 does not extend below the edge where the image side meets the reflective side. The image side (b) of the prism 300 includes a convex optical surface 360B. The object side (c) of the prism 300 includes a convex optical surface 360A. A portion of the object side (c) surface of the prism 300 is coated with an opaque material 340 that acts as an aperture stop at the object side (c) surface, providing an aperture 350 at the optical surface 360A. The bottom (d) surface of the prism 300 is a reflective surface 370 that acts to redirect light received on a first optical axis through optical surface 360A on the object side (b) on to a second optical axis that exits through optical surface 360B on the image side (c). In some embodiments, at least a portion of the reflective surface 370 is coated with a reflective material that redirects the light. In some embodiments, a mirror on the reflective surface 370 redirects the light. In some embodiments, the reflective surface 370 redirects the light due to total internal reflection (TIR).

FIG. 4 is a diagram showing details of an example lens element 480 with a corresponding interlock structure to that of the prism of FIG. 3, according to some embodiments. FIG. 4 shows a side view (a), a top view (b), and an object side view (c) of the lens 480. Lens 480 is the first lens on the image side (c) of the prism 300, and is formed with a complementary structure or surface 482 on the object side (c) that is configured to precisely couple to the interlock 330 structure on the image side (b) of the prism 300. As shown in the object side view (c) of the lens element 480, the top and bottom of the lens element 480 may be truncated to reduce Z axis height. In this example, lens element 480 is a biconvex negative lens; however, lens 480 may be any type of lens, e.g. a positive lens, meniscus lens, etc., depending on the particular application.

Figure 5A:
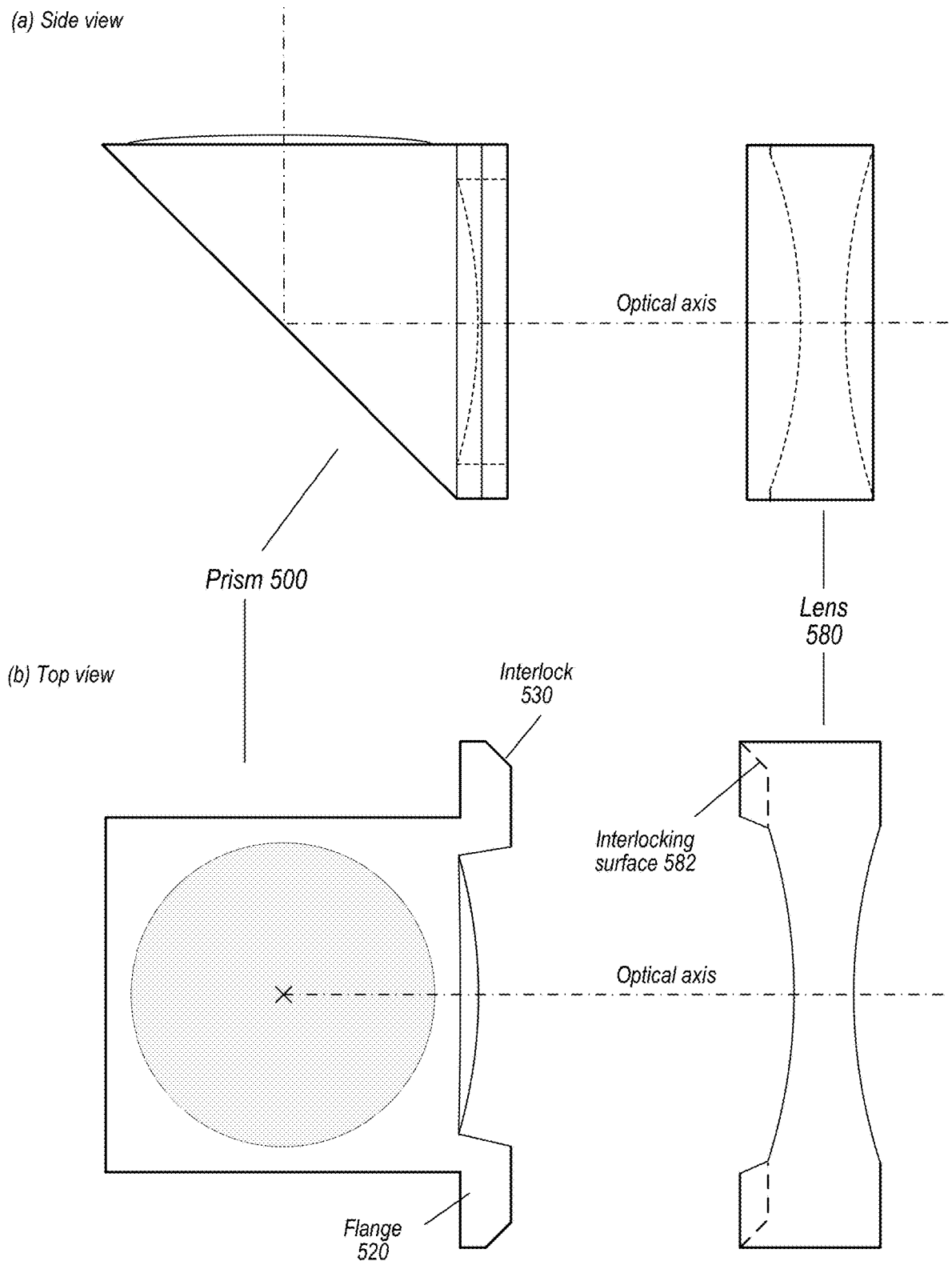
FIGS. 5A and 5B illustrate interlocking a lens element with a prism, according to some embodiments.
Figure 5B:
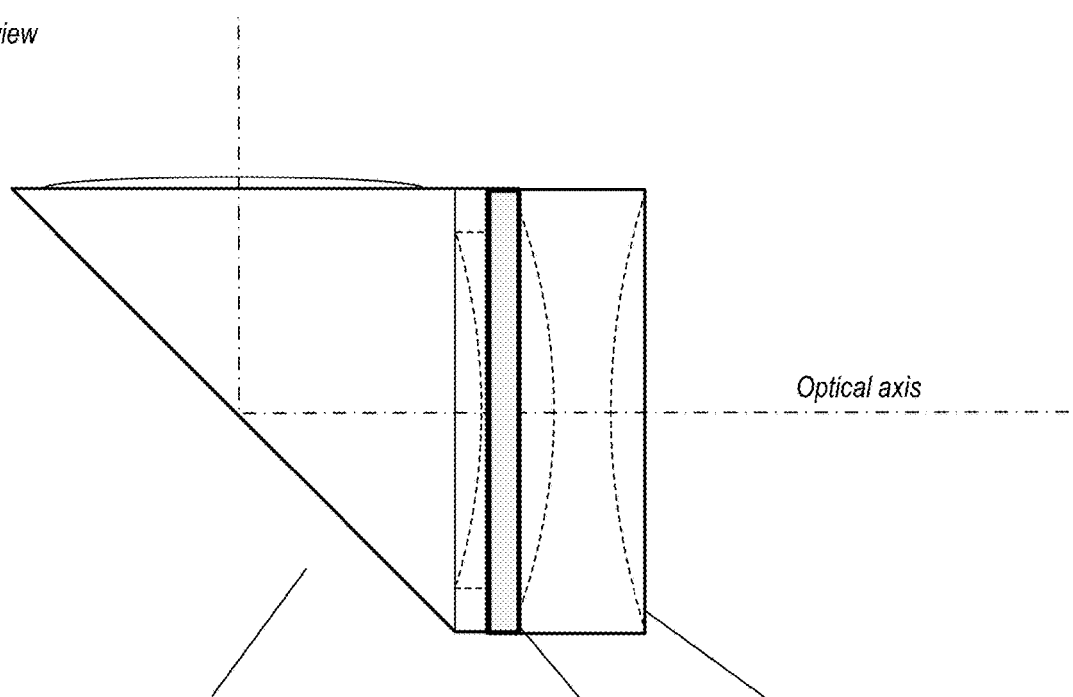
Figure 5B:
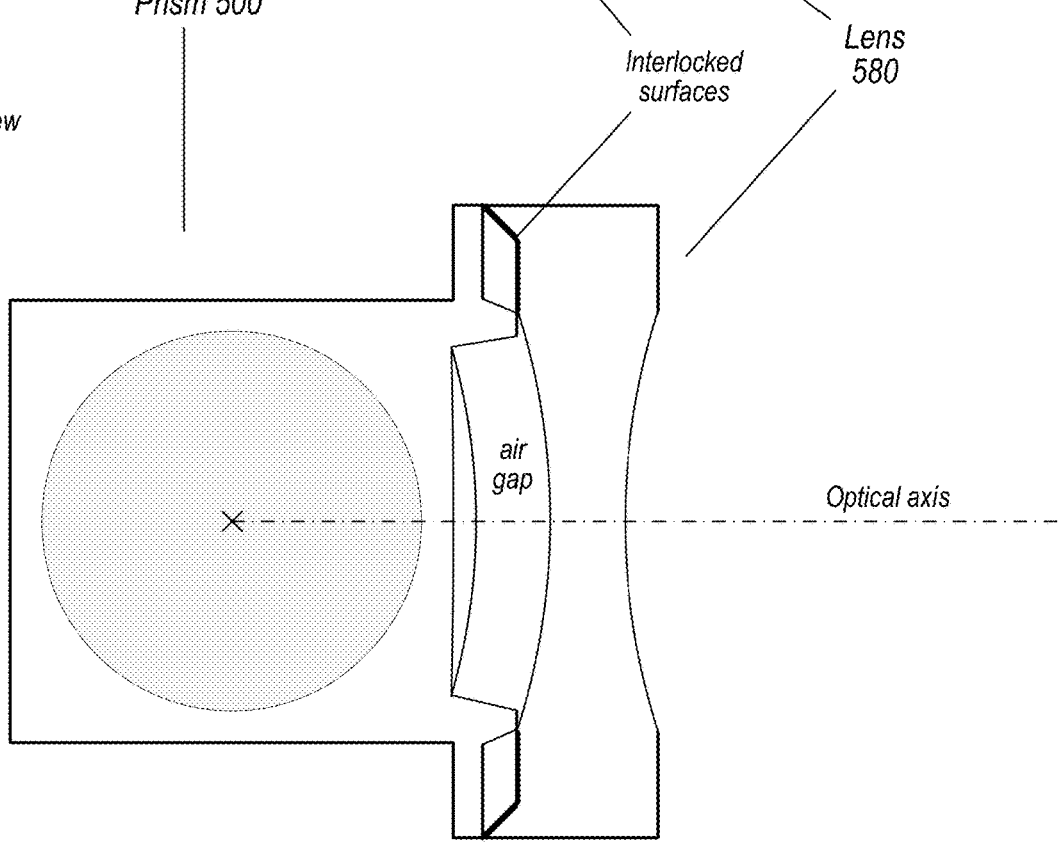

FIGS. 5A and 5B illustrate interlocking a lens element as shown in FIG. 4 with a prism as shown in FIG. 3, according to some embodiments. FIG. 5A shows a side view (a) and a top view (b) of the prism 500 and lens 580. The image side of prism 500 includes an interlock 530 structure. Lens 580 is the first lens on the image side (c) of the prism 500, and is formed with a complementary structure or surface 582 on the object side that is configured to precisely couple to the interlock 530 structure on the image side (b) of the prism 500. The top and bottom of the prism 500 and the lens 580 may be truncated as shown in FIGS. 3 and 4.

FIG. 5B shows the prism 500 and lens 480 of FIG. 5A when interlocked. Surface 582 on the object side of lens 580 is interlocked with interlock 530 structure on the image side of prism 500. The interlock 530 of prism 500 and the complementary surface 582 of lens 580 may provide high accuracy when assembling the lens system by precisely aligning the object side optical surface of the first lens 580 with the image side optical surface of the prism 500 so that the optical axis is centered in the first lens 580 and the second portion of the folded optical axis of the prism 500 is thus aligned with an optical axis of the first lens 580. The interlocking structure may also make lens system assembly much easier than conventional assembly methods that would require more complex alignment procedures.

Figure 6:
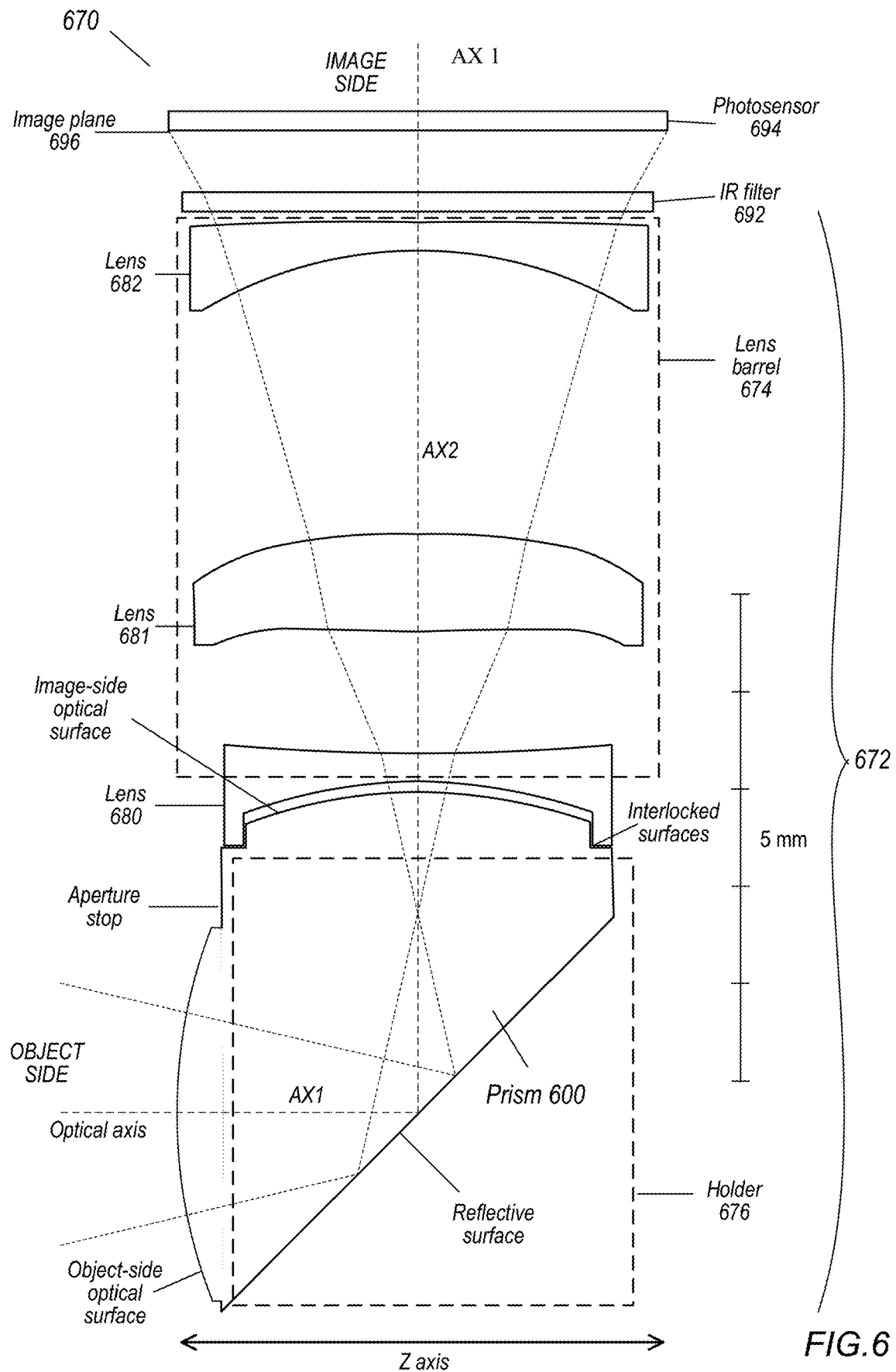
FIG. 6 illustrates an example camera that includes an optical prism with interlock as illustrated in FIGS. 1A through 5B, according to some embodiments.

FIG. 6 illustrates an example camera that includes an optical prism with interlock as illustrated in FIGS. 1A through 5B, according to some embodiments. A camera 670 may include a folded lens system 672 and a photosensor 694. The camera 670 may also include an infrared filter 692, for example located between the lens system 672 and the photosensor 694. The folded lens system 672 may include, in order from the object side of the camera 670 to the image side of the camera 670, a prism 600 and a lens stack including one or more refractive lens elements. In this example, there are three lens elements 680, 681, and 682 in the lens stack. The number, shape, and spacing of the lens elements are given by way of example, and are not intended to be limiting.

The prism 600 and lenses 680-682 may be composed of any of a variety of optical materials, e.g. optical plastic, polymer, or glass, and may be injection molded or otherwise manufactured. In some embodiments, the prism 600 may be formed of a material with an Abbe number that is higher than that of the refractive lenses. In some embodiments, at least two of the refractive lens elements may be formed of materials with different Abbe numbers.

In some embodiments, the prism 600 may be mounted in a holder 676. The lens elements may be mounted in a lens barrel 674. The holder 676, lens barrel 674, IR filter 692, and photosensor 694 may be assembled together to form a camera 670, and may, for example, be mounted inside a camera body or frame.

FIG. 6 shows a side view of the prism 600 and lenses 680-682. Prism 600 may have refractive power (e.g., positive refractive power). In this example, the image side of the prism 600 includes a convex optical surface, and the object side of the prism 600 also includes a convex optical surface. A portion of the object side surface of the prism 600 may be coated with an opaque material that provides an aperture stop at the object side surface. A reflective surface of the prism 600 provides a folded optical axis for the lens system 672 by bending the optical axis (e.g., by 90 degrees) to reduce the Z-height of the lens system 672. The prism 600 redirects light received through the aperture stop from an object field from a first axis (AX1) to the lens stack on a second axis (AX2). A reflective coating, a mirror, or total internal reflection (TIR) may be used at the reflective surface of prism 600 to redirect the light from AX1 to AX2. The lens element(s) in the lens stack refract the light to form an image at an image plane 696 at or near the surface of the photosensor 694. The camera may also include an infrared filter 692, for example located between the lens system 672 and the photosensor 694.

The image side of prism 600 includes an interlock structure. Lens 680 is the first lens on the image side of the prism 600, and is formed with a complementary structure or surface on the object side that is configured to precisely couple to the interlock structure on the image side of the prism 600. In some embodiments, for precision, the interlock structures of the prism 600 and lens 680 may be formed at the same time and using the same technique as the optical surfaces of the prism 600 and the lens 680. The interlock structures may provide high accuracy when assembling the lens system 672 by precisely aligning the object side optical surface of the first lens 680 with the image side optical surface of the prism 600 so that the optical axis is centered in the first lens 680. The interlocking structure may also make lens system assembly much easier than conventional assembly methods that would require more complex alignment procedures.

In assembling the lens system 672, the first lens 680 may be interlocked with the prism 600, and then lens barrel 674 including the other lenses 681 and 682 may be attached and aligned. Alternatively, the lenses 680, 681, and 682 may be assembled and aligned in the lens barrel 674 with the interlocking surface of the first lens 680 exposed on the object side, and the lens 680 in lens barrel 674 may then be interlocked with the image side of the prism 600.

Figure 7:
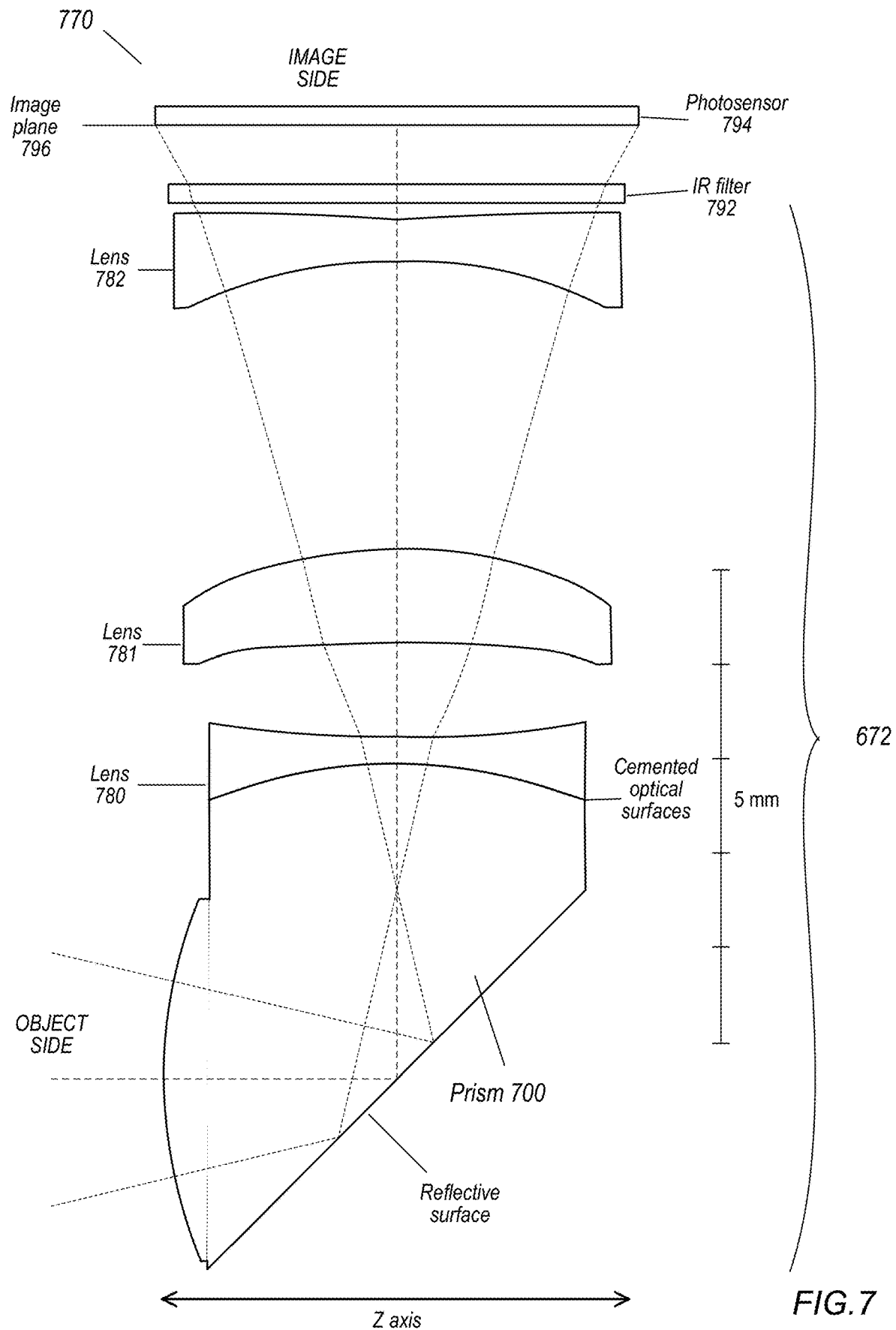
FIG. 7 illustrates an alternative method in which complementary optical surfaces of the prism and first lens element act as the interlocking mechanism, according to some embodiments.

FIG. 7 illustrates an alternative method in which complementary optical surfaces of the prism and first lens element act as the interlocking mechanism, according to some embodiments. A camera 770 may include a folded lens system 772 and a photosensor 794. The camera 770 may also include an infrared filter 792, for example located between the lens system 772 and the photosensor 794. The folded lens system 772 may include, in order from the object side of the camera 770 to the image side of the camera 770, a prism 700 and a lens stack including one or more refractive lens elements. In this example, there are three lens elements 780, 781, and 782 in the lens stack. The number, shape, and spacing of the lens elements are given by way of example, and are not intended to be limiting.

The prism 700 and lenses 780-782 may be composed of any of a variety of optical materials, e.g. optical plastic, polymer, or glass, and may be injection molded or otherwise manufactured. In some embodiments, the prism 700 may be formed of a material with an Abbe number that is higher than that of the refractive lenses. In some embodiments, at least two of the refractive lens elements may be formed of materials with different Abbe numbers.

FIG. 7 shows a side view of the prism 700 and lenses 780-782. Prism 700 may have refractive power (e.g., positive refractive power). In this example, the image side of the prism 700 includes a convex optical surface, and the object side of the prism 700 also includes a convex optical surface. A portion of the object side surface of the prism 700 may be coated with an opaque material that provides an aperture stop at the object side surface. A reflective surface of the prism 700 provides a folded optical axis for the lens system 772 by bending the optical axis (e.g., by 90 degrees) to reduce the Z-height of the lens system 772. The prism 700 redirects light received through the aperture stop from an object field from a first axis to the lens stack on a second axis. A reflective coating, a mirror, or total internal reflection (TIR) may be used at the reflective surface of prism 500 to redirect the light from the first axis to the second axis. The lens element(s) in the lens stack refract the light to form an image at an image plane 796 at or near the surface of the photosensor 794. The camera may also include an infrared filter 792, for example located between the lens system 772 and the photosensor 794.

In this example, the image side of the prism 700 includes a convex optical surface. Lens 780 is the first lens on the image side of the prism 700, and is formed with a complementary concave optical surface on the object side that is configured to precisely couple to the convex surface on the image side of the prism 700. In some embodiments, the two optical surfaces may be cemented. The complementary optical surfaces may provide high accuracy when assembling the lens system 772 by precisely aligning the object side optical surface of the first lens 780 with the image side optical surface of the prism 700 so that the optical axis is centered in the first lens 780. The complementary optical surfaces may also make lens system assembly much easier than conventional assembly methods that would require more complex alignment procedures.

In assembling the lens system 772, the first lens 780 may be coupled with the prism 700, and then lens barrel 774 including the other lenses 781 and 782 may be attached and aligned. Alternatively, the lenses 780, 781, and 782 may be assembled and aligned in the lens barrel 774 with the optical surface of the first lens 780 exposed on the object side, and the lens 780 in lens barrel 774 may then be coupled with the image side of the prism 700.

Figure 8:
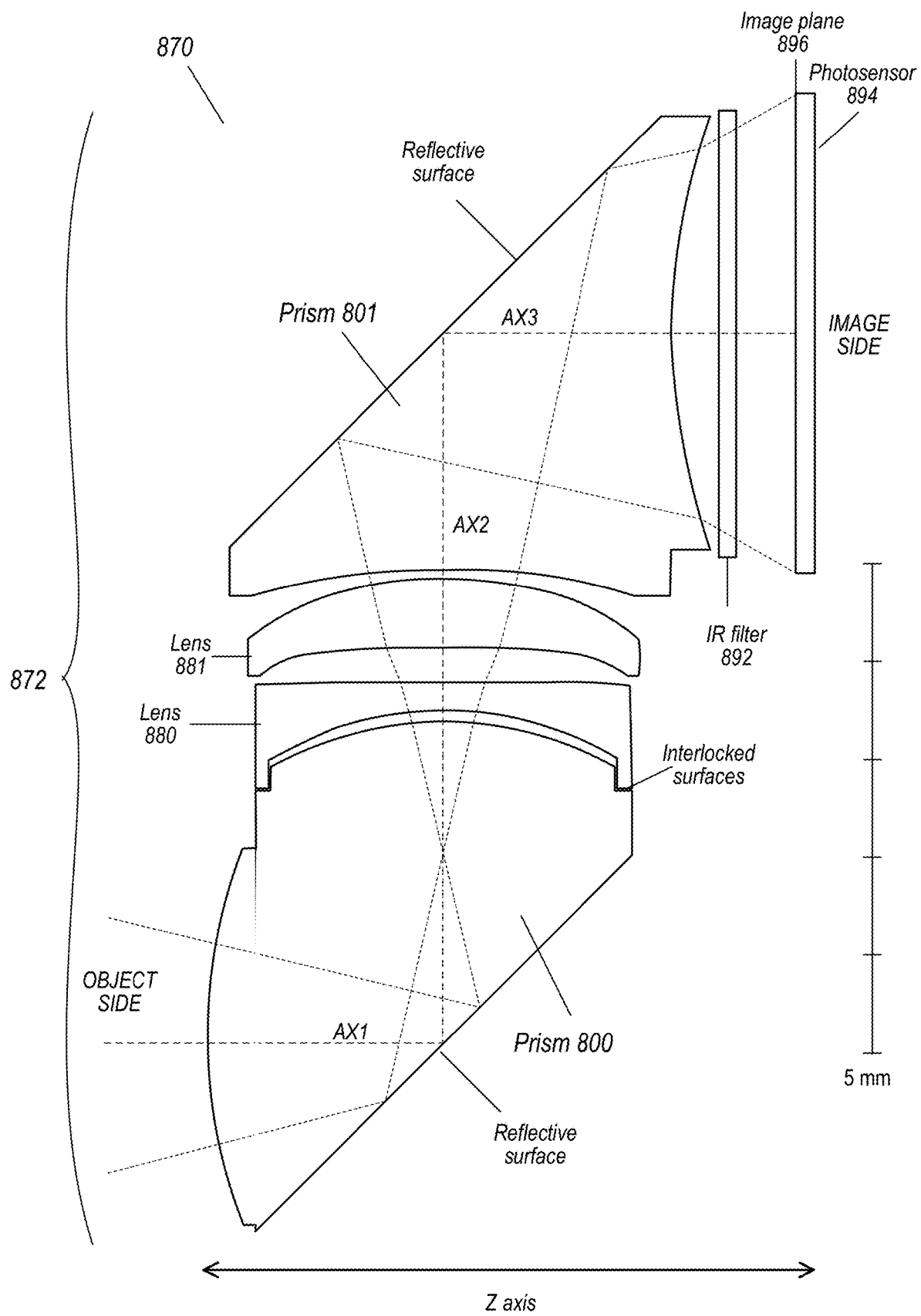
FIG. 8 illustrates an example lens system that includes two prisms, according to some embodiments.

FIG. 8 illustrates an example lens system that includes two prisms, according to some embodiments. A camera 870 may include a folded lens system 872 and a photosensor 894. The camera 870 may also include an infrared filter 892, for example located between the lens system 872 and the photosensor 894. The folded lens system 872 may include, in order from the object side of the camera 870 to the image side of the camera 870, a first prism 800, a lens stack including one or more refractive lens elements, and a second prism 801. In this example, there are two lens elements 880, 881 in the lens stack. The number, shape, and spacing of the lens elements are given by way of example, and are not intended to be limiting.

The prisms 800, 801 and lenses 880, 881 may be composed of any of a variety of optical materials, e.g. optical plastic, polymer, or glass, and may be injection molded or otherwise manufactured. In some embodiments, prism 800 may be formed of a material with an Abbe number that is higher than that of the refractive lenses. In some embodiments, at least two of the refractive lens elements may be formed of materials with different Abbe numbers.

FIG. 8 shows a side view of the prisms 800, 801 and lenses 880, 881. Prism 800 may have refractive power (e.g., positive refractive power). In this example, the image side of the prism 800 includes a convex optical surface, and the object side of the prism 800 also includes a convex optical surface. A portion of the object side surface of the prism 800 may be coated with an opaque material that provides an aperture stop at the object side surface. In some embodiments, prism 801 may also have refractive power (e.g., negative refractive power). In this example, the image side of the prism 801 includes a concave optical surface, and the object side of the prism 801 also includes a concave optical surface.

The first prism 800 redirects light received through the aperture stop from an object field from a first axis (AX1) to the lens stack on a second axis (AX2). The lens element(s) 880 and 881 in the lens stack refract the light to the second prism 801 that redirects the light onto a third axis (AX3) on which a photosensor 894 of the camera 870 is disposed. The redirected light forms an image at an image plane 896 at or near the surface of the photosensor 894. The camera may also include an infrared filter 892, for example located between the lens system 872 and the photosensor 894. A reflective coating, a mirror, or total internal reflection (TIR) may be used at the reflective surfaces of prisms 800 and 801 to redirect the light.

The image side of prism 800 includes an interlock structure. Lens 880 is the first lens on the image side of the prism 800, and is formed with a complementary structure or surface on the object side that is configured to precisely couple to the interlock structure on the image side of the prism 800. In some embodiments, for precision, the interlock structures of the prism 800 and lens 880 may be formed at the same time and using the same technique as the optical surfaces of the prism 800 and the lens 880. While not shown in FIG. 8, in some embodiments, the object side of prism 801 may include an interlock structure similar to that of prism 800. The last lens element in the lens stack (lens 881, in this example) may be formed with a complementary structure or surface on the image side that is configured to precisely couple to the interlock structure on the object side of the prism 801.

Figure 9:
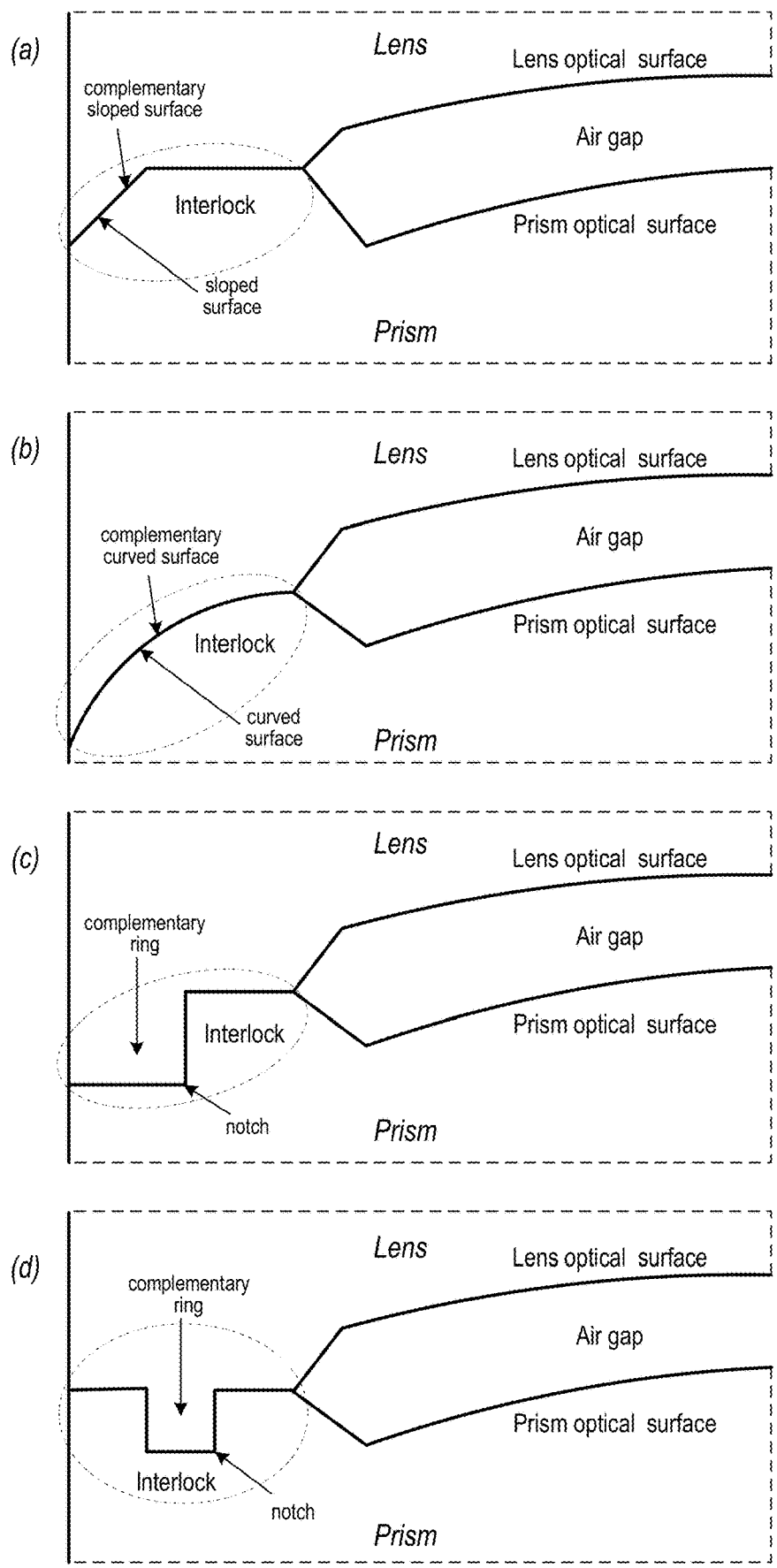
FIG. 9 shows several non-limiting examples of interlock structures, according to some embodiments.

FIG. 9 shows several non-limiting examples of interlock structures, according to some embodiments. The object side of the prism has an interlock structure on an outer edge or rim, for example on a flange as illustrated in FIGS. 1B, 2A, and 3. In some embodiments, the flange may extend around the prism. However, in some embodiments, the flange (and thus the interlock structure) may be truncated on one or more sides of the prism, for example as illustrated in FIG. 1B. A first lens element on the image side of the prism has a complementary interlock structure on an outer edge or rim. In some embodiments, the outer edge or rim may extend around the lens. However, in some embodiments, the outer edge or rim (and thus the interlock structure) may be truncated on one or more sides of the lens, for example as illustrated in FIG. 4. In some embodiments, for precision, the interlock structures may be formed at the same time and using the same technique as the optical surfaces of the prism and the lens. The interlock structures may provide high accuracy when assembling the lens system by precisely aligning the object side optical surface of the first lens with the image side optical surface of the prism so that the optical axis is centered in the first lens. The interlocking structure may also make lens system assembly much easier than conventional assembly methods that would require more complex alignment procedures.

FIG. 9(*a*) shows an example where the interlock structure of the prism includes a sloped surface, and the lens includes a complementary sloped surface that interlocks with the interlock structure of the prism. FIG. 9(*b*) shows an example where the interlock structure of the prism includes a curved surface, and the lens includes a complementary curved surface that interlocks with the interlock structure of the prism. FIG. 9(*c*) shows an example where the interlock structure of the prism includes a notch at an outer edge of the prism, and the lens includes a complementary ring that interlocks with the interlock structure of the prism. FIG. 9(*d*) shows an example where the interlock structure of the prism includes a notch on the surface of the prism, and the lens includes a complementary ring that interlocks with the interlock structure of the prism.

Example Flowchart

Figure 10:
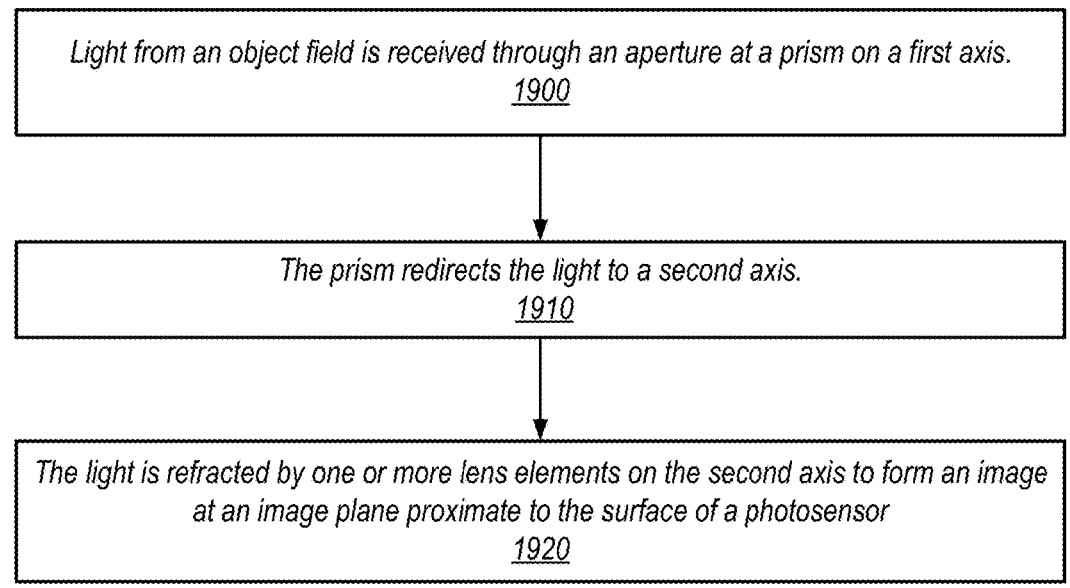
FIG. 10 is a flowchart of a method for capturing images using embodiments of a lens system as illustrated in FIGS. 1A through 9, according to some embodiments.

FIG. 10 is a flowchart of a method for capturing images using embodiments of a lens system that includes an optical prism with an interlock structure as illustrated in FIGS. 1A through 9, according to some embodiments. In the lens system, the image side of the prism may be interlocked with the object side of a first lens element of a lens stack. In some embodiments, the image side and/or the object side of the prism may have an optical surface (e.g., a convex or concave optical surface) to provide positive or negative refractive power to the prism.

As indicated at 1900, light from an object field is received on a first axis through an aperture at the object side surface of the prism. In some embodiments, the aperture may be formed by an opaque coating on at least a portion of the object side surface of the prism, for example as illustrated in FIG. 2A. In some embodiments, the object side of the prism may have an optical surface (e.g., a convex or concave optical surface) to provide optical power to the prism. As indicated at 1910, the light received at the object side of the prism is redirected by a reflective surface of the prism through an image side of the prism to a lens stack including one or more refractive lens elements on a second axis. A reflective coating, a mirror, or total internal reflection (TIR) may be used at the reflective surface to redirect the light from the first axis to the second axis. In some embodiments, the image side of the prism may have an optical surface (e.g., a convex or concave optical surface) to provide optical power to the prism. The object side of the first lens element of the lens stack is interlocked with the image side of the prism as described in FIGS. 1A through 9. As indicated at 1920, the light received from the prism is then refracted by the one or more lens elements in the lens stack to form an image at an image plane at or near the surface of a photosensor or sensor module on the second axis. An image may then be captured by the photosensor or sensor module.

While not shown in FIG. 10, in some embodiments, the light may pass through an infrared filter that may for example be located between the lens stack and the photosensor.

In some embodiments, the components of the lens system referred to in FIG. 10 may be configured as illustrated in FIG. 6 or 7. However, those configurations are given as examples; note that variations on the examples given in the Figures are possible while achieving similar results.

In some embodiments, a second prism may be located on the second axis at the image side of the lens stack, for example as shown in FIG. 8. In these embodiments, the light received from the first prism is refracted by the one or more lens elements in the lens stack to the second prism, which redirects the light to the photosensor or sensor module on a third axis. In some embodiments, the second prism may also include an interlock structure that may, for example, interlock with a last lens element of the lens stack. In some embodiments, the object side and/or the image side of the second prism may have an optical surface (e.g., a convex or concave optical surface) that provides positive or negative refractive power to the second prism.

Example Computing Device

Figure 11:
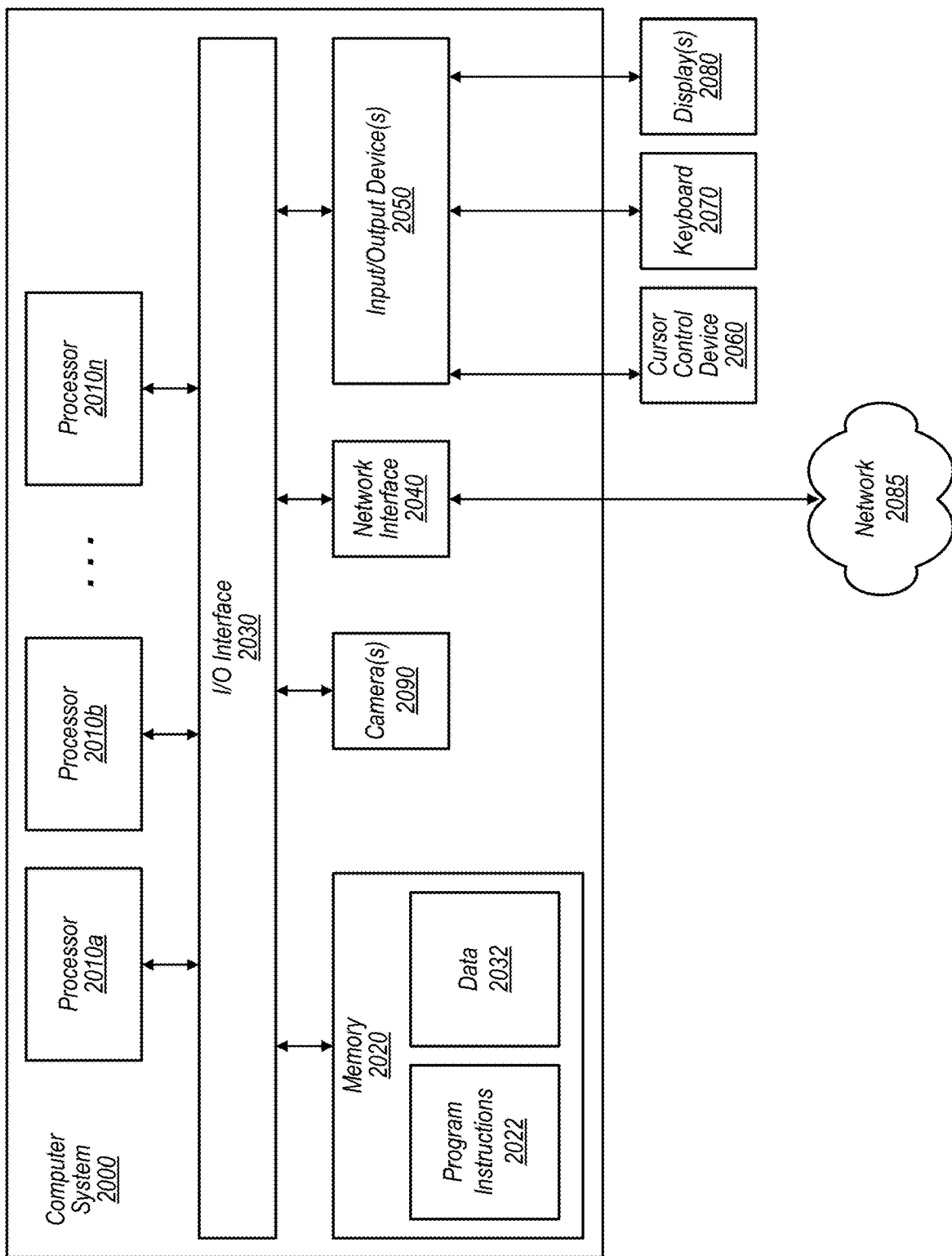
FIG. 11 illustrates an example computer system that may be used in embodiments.

FIG. 11 illustrates an example computing device, referred to as computer system 2000, that may include or host embodiments of a camera with a lens system as illustrated in FIGS. 1A through 10. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example a camera that includes a lens system with interlocking prisms as described above with respect to FIGS. 1A through 10.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An optical prism, comprising:
   an object side;
   a reflective surface that redirects light received through the object side from a first portion of an optical axis to a second portion of the optical axis;
   an image side having a convex optical surface through which the second portion of the optical axis passes; and
   an interlock structure at the image side of the prism, wherein the interlock structure includes a flange portion having at least one surface configured to interlock with a complementary surface of a refractive lens element, wherein the interlock structure includes a curved surface, or a straight surface oriented in a direction parallel to the second portion of the optical axis, and wherein the flange portion extends outward from the image side of the prism in the direction parallel to the second portion of the optical axis to create an air gap between the convex optical surface and an object side surface of the refractive lens element.

2. The optical prism as recited in claim 1, wherein the interlock structure aligns the lens element with the prism so that the second portion of the optical axis is centered in an object side optical surface of the lens element.

3. The optical prism as recited in claim 1, wherein the interlock structure is configured to prevent movement of the lens element with respect to the prism.

4. The optical prism as recited in claim 1, wherein a portion of an object side surface of the prism is coated with an opaque material to provide an aperture stop at the object side of the prism.

5. The optical prism as recited in claim 1, wherein the object side of the prism includes one of a convex optical surface or a concave optical surface.

6. A lens system, comprising:
   a plurality of elements arranged along a folded optical axis of the lens system, wherein the plurality of elements includes:
   an optical prism, comprising:
      an object side;
      a reflective surface that redirects light received through the object side from a first portion of an optical axis to a second portion of the optical axis;
      an image side having a convex optical surface through which the second portion of the optical axis passes; and
      an interlock structure at the image side of the prism, wherein the interlock structure includes a flange portion having at least one surface configured to interlock with a complementary surface of a first refractive lens element, wherein the interlock structure includes a curved surface, or a straight surface oriented in a direction parallel to the second portion of the optical axis, and wherein the flange portion extends outward from the image side of the prism in the direction parallel to the second portion of the optical axis to create an air gap between the convex optical surface and an object side surface of the first refractive lens element; and
   a lens stack comprising one or more refractive lens elements including the first refractive lens element and that refract light on the second portion of the folded optical axis to form an image at an image plane, wherein an object side of the first refractive lens element in the lens stack includes the complementary surface that is configured to interlock with the at least one surface of the flange portion of the prism.

7. The lens system as recited in claim 6, wherein a portion of an object side surface of the prism is coated with an opaque material to provide an aperture stop at the object side surface of the prism.

8. The lens system as recited in claim 6, wherein the interlocking surfaces of the prism and the first refractive lens element are configured to prevent movement of the first refractive lens element with respect to the prism.

9. The lens system as recited in claim 6, wherein the object side of the prism includes one of a convex optical surface or a concave optical surface.

10. The lens system as recited in claim 6, wherein interlocking the first refractive lens element with the prism aligns an object side optical surface of the first refractive lens element with an image side optical surface of the prism so that the second portion of the folded optical axis is aligned with an optical axis of the first refractive lens element.

11. The lens system as recited in claim 6, further comprising a second prism located on the image side of the lens stack that redirects light received from the lens stack from the second portion of the folded optical axis to a third portion of the folded optical axis.

12. A camera, comprising:
a photosensor configured to capture light projected onto a surface of the photosensor;
an optical prism, comprising:
an object side;
a reflective surface that redirects light received through the object side from a first portion of an optical axis to a second portion of the optical axis;
an image side having a convex optical surface through which the second portion of the optical axis passes; and
an interlock structure at the image side of the prism, wherein the interlock structure includes a flange portion having at least one surface configured to interlock with a complementary surface of a first refractive lens element, wherein the interlock structure includes a curved surface, or a straight surface oriented in a direction parallel to the second portion of the optical axis, and wherein the flange portion extends outward from the image side of the prism in the direction parallel to the second portion of the optical axis to create an air gap between the convex optical surface and an object side surface of the first refractive lens element; and
a lens stack comprising one or more refractive lens elements including the first refractive lens element and that refract light on the second portion of the optical axis to form an image at an image plane at or near a surface of the photosensor, wherein an object side of the first refractive lens element of the one or more refractive lens elements includes the complementary surface that is configured to interlock with the at least one surface of the flange portion of the prism.

13. The camera as recited in claim 12, wherein a portion of an object side surface of the prism is coated with an opaque material to provide an aperture stop at the object side surface of the prism.

14. The camera as recited in claim 12, wherein the interlocking surfaces of the prism and the first refractive lens element are configured to prevent movement of the first refractive lens element with respect to the prism.

15. The camera as recited in claim 12, wherein the object side of the prism includes one of a convex optical surface or a concave optical surface.

16. The camera as recited in claim 12, wherein interlocking the first refractive lens element with the prism aligns an object side optical surface of the first refractive lens element with an image side optical surface of the prism so that the second portion of the optical axis is aligned with an optical axis of the first refractive lens element.

17. The camera as recited in claim 12, further comprising a second prism located on the image side of the lens stack that redirects light received from the lens stack from the second portion of the folded optical axis to a third portion of the folded optical axis.

18. The camera as recited in claim 17, wherein the second prism comprises another interlock structure that is configured to interlock with another refractive lens element of the lens stack.

19. The camera as recited in claim 17, wherein at least one of the object side or the image side of the second prism comprises an optically refractive surface that provides refractive power to the second prism.

20. The lens system as recited in claim 11, wherein the second prism comprises another interlock structure that is configured to interlock with another refractive lens element of the lens stack.

* * * * *